(12) United States Patent
Ichida

(10) Patent No.: US 7,398,155 B2  
(45) Date of Patent: Jul. 8, 2008

(54) CAR NAVIGATION SYSTEM

(75) Inventor: Takashi Ichida, Chiryu (JP)

(73) Assignee: Denso Corporation, Kariya (JP)

( * ) Notice: Subject to any disclaimer, the term of this patent is extended or adjusted under 35 U.S.C. 154(b) by 329 days.

(21) Appl. No.: 11/085,252

(22) Filed: Mar. 22, 2005

(65) Prior Publication Data

US 2005/0222758 A1 Oct. 6, 2005

(30) Foreign Application Priority Data

Mar. 31, 2004 (JP) ............... 2004-106193
Feb. 23, 2005 (JP) ............... 2005-047279

(51) Int. Cl.
*G01C 21/32* (2006.01)

(52) U.S. Cl. .............. 701/208; 701/200; 701/207; 701/210; 701/213; 701/216; 701/217; 701/220; 340/995.1; 340/995.13; 340/995.14; 340/995.19; 340/995.25; 340/995.27

(58) Field of Classification Search ............. 701/208; 340/995.17
See application file for complete search history.

(56) References Cited

U.S. PATENT DOCUMENTS

2002/0198694 A1* 12/2002 Yang et al. ............... 703/6

FOREIGN PATENT DOCUMENTS

| JP | A-H09-243381 | 9/1997 |
| JP | A-H10-232605 | 9/1998 |
| JP | A-2001-108458 | 4/2001 |
| JP | 2003-114130 | * 4/2003 |

* cited by examiner

*Primary Examiner*—Thomas G. Black
*Assistant Examiner*—Wae Lenny Louie
(74) *Attorney, Agent, or Firm*—Posz Law Group, PLC

(57) ABSTRACT

When an elevated road and a usual fly-under road are located in a stacked state, two roads are shown in overlapped lines on a display unit of a car navigation system in a subject vehicle. When the subject vehicle travels the fly-under road, the elevated road is shown in a translucent state. Thus, a user of the subject vehicle can recognize a state of the fly-under road the subject vehicle is traveling. In contrast, when the subject vehicle travels the elevated road, the elevated road is shown in a non-translucent state. The elevated road thereby becomes easy to see, so its advancing direction can be easily seen.

4 Claims, 7 Drawing Sheets

CAR NAVIGATION SYSTEM

CROSS REFERENCE TO RELATED APPLICATIONS

This application is based on and incorporates herein by reference Japanese Patent Applications No. 2004-106193 filed on Mar. 31, 2004, and No. 2005-47279 filed on Feb. 23, 2005.

FIELD OF THE INVENTION

The present invention relates to a car navigation system mounted in a subject vehicle. In particular, it relates to a displaying method of the system to enable a user to easily recognize a road that the subject vehicular travels even when the road is one of two parallel roads that run in parallel with each other.

BACKGROUND OF THE INVENTION

A car navigation system mounted in a subject vehicle detects a current position of the subject vehicle to thereby show a map surrounding the current position on a display unit of the system. Here, this map is shown in two-dimensional expression, three-dimensional expression, or the like. In the three-dimensional expression that indicates both roads and buildings three-dimensionally, a road is sometimes hidden by a building or by an over-crossing overpass road. In this case, the hiding building or overpass road is shown in a transmission technique, so that the hidden road or portions can become visible, as described in Patent Document 1.

Patent Document 1: JP-2001-108458 A

In urban areas, an expressway is sometimes built as an elevated road over a usual city road, so the expressway as the elevated road and the usual road as a fly-under road, i.e., two parallel roads, run in vertically parallel with each other, in a vertical two-layered state.

On the map shown by the car navigation system, the two parallel roads are shown as two overlapped lines that indicate the two roads. This makes it difficult to determine which road of the parallel roads the subject vehicle travels, even though the current position of the subject vehicle is shown on the map. Further, typically, one line of the overlapped two lines indicating the expressway hides the other indicating the usual road. States of the fly-under usual road hidden by the elevated expressway cannot be thereby easily recognized, so the user feels inconvenient.

This problem can be experienced similarly in the following cases. First is that a wide bypass road adjoins, in parallel, a narrow usual road such as a service road. Second is that an underground road including half-underground road runs, in vertically parallel, under an aboveground or ground-level road.

SUMMARY OF THE INVENTION

It is an object of the present invention to provide a car navigation system capable of solving the above and other problems. Namely, in a case that multiple roads are shown in overlapped lines on a map shown by the car navigation system, an on-traveling road that a subject vehicle travels can be visibly recognizable.

To achieve the above object, a car navigation system mounted in a vehicle is provided with the following. A position obtaining unit is included for obtaining a current position of the vehicle. A map data obtaining unit is included for obtaining map data. A display unit is included for displaying a map surrounding the obtained current position. A first determining unit is included for determining whether parallel roads that are located mutually in parallel are present within the obtained map data. A second determining unit is included for determining whether the obtained current position is on a given road within the determined parallel roads. Further, a display changing unit is included for displaying the given road in a non-translucent state and a road in parallel with the given road in a translucent state, when the obtained current position is determined to be on the given road.

Under this structure of the car navigation system, in a case that parallel roads are shown as being overlapped on a displayed map, a road that a subject vehicle is traveling can be easily recognized by being shown in a non-translucent state.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

A car navigation system according to a first embodiment of the present invention will be explained with reference to FIGS. 1 to 7. The system 1 includes the following: a control circuit 2 as a controlling unit, a position detector 3 as a position obtaining unit, a pitch angle sensor 4, a map data input unit 5 as a map data obtaining unit, a sound generation device 7 as a sound generating unit, a VICS (Vehicle Information and Communication System) receiver 8 as a traffic information obtaining unit, a manipulation switch group 9, a remote control sensor 10, a remote controller 9 paring with the remote control sensor 10, and an external memory 12.

Figure 1:
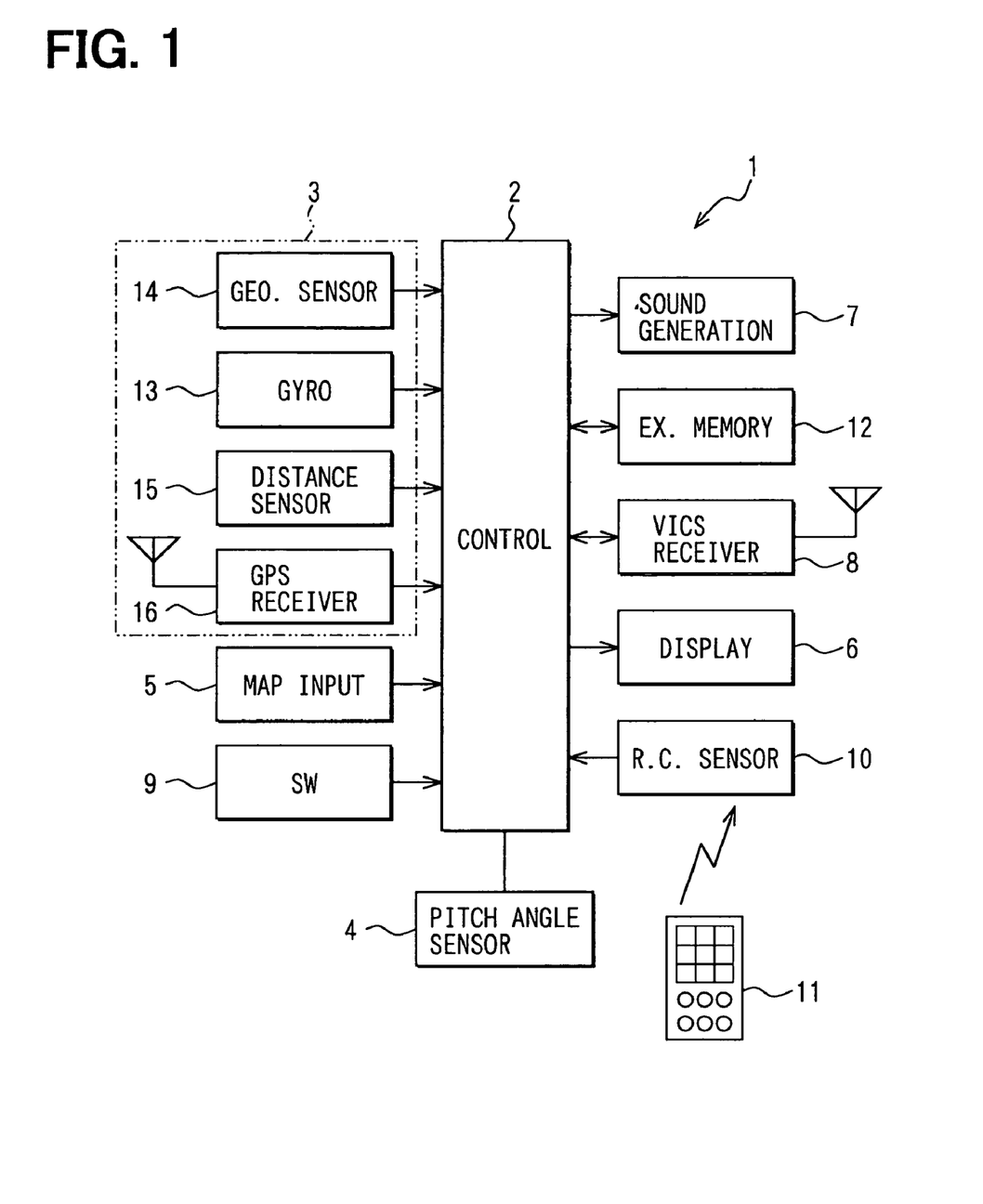
FIG. 1 is a block diagram of a structure of a car navigation system according to a first embodiment of the present invention.

The control circuit 2 has a function of controlling overall operations of the system 1 and mainly includes a microcomputer. Namely, the control circuit 2 includes a CPU, a RAM, a ROM, an input/output, and a bus connecting the foregoing (non shown). The ROM stores an execution program activating the system 1, while the RAM temporarily stores temporary data during the execution of the program, map data obtained from the map data input unit 5, traffic information obtained from the VICS receiver 8, and the like.

The position detector 3 includes a gyroscope 13, a geomagnetic sensor 14, a distance sensor 15, and a GPS (Global Positioning System) receiver 16. These sensors or the like 13 to 16 have individual different-natured detection errors, so these sensors or the like 13 to 16 are combined for mutually complementing others. High accurate position detection can be thereby achieved. Depending on required accuracy, only some of the sensors can be selectively used; further, another sensor such as a steering rotation sensor or wheel sensor detecting rotations of individual wheels can be included in the position detector 3.

Figure 4:
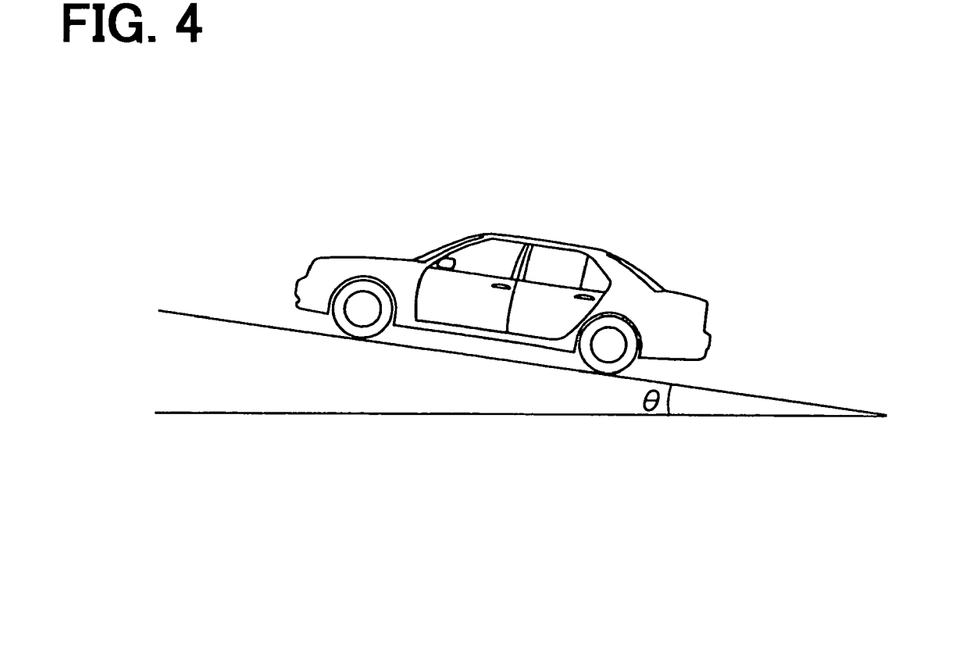
FIG. 4 is a view explaining a pitch angle.

The pitch angle sensor 4 detects an angle θ between a longitudinal axis of the vehicle and the ground in an advancing direction of the vehicle, as shown in FIG. 4.

The map data input unit 5 reads map data or the like from a storage medium such as a CD-ROM and a DVD-ROM. The read information includes map data, data for map matching, data for sound guidance of routes, and data for retrieving on-map positions using location names. These read data are inputted to the control circuit 2.

The display unit 6 has a display screen such as a color liquid crystal display that shows map data, characters, or symbols.

The manipulation switch group 9 is a touch-panel or mechanical switches integrated with the display unit 6 for inputting data or setting items.

The VICS receiver 8 receives road traffic information sent from the VICS as an external information source to then input it to the control circuit 2.

The control circuit 2 detects traffic regulation regions, congested roads, or congested regions using the traffic information inputted from the VICS receiver 8. The control circuit 2 further includes a function of display control. In this control, the current position is computed based on the information from the position detector 3, and a road map surrounding the current position is displayed on the display screen based on the map data. Further, pointers that show the current position and the advancing direction of the vehicle are displayed to be superimposed on the road map. Scales of the displayed map can be changed by manipulating the switch group 9.

The control circuit 2 further includes functions of setting a route to a destination and indicating advancing directions of the vehicle based on the set route by sound from the sound generation device 7. Namely, when a destination or a passing point is inputted by manipulating the switch group 9 or the remote controller 11, an optimum route from a current position to the destination is automatically designated and emphatically displayed on a map displayed on the display screen of the display unit 6. The control circuit 2 further conducts by sound the user to the advancing direction along the route. Here, the method for designating the optimum route can adopt Dijkstra method.

Further, during the traveling of the vehicle, the VICS receiver 8 may receive the traffic information such as a congested point, a traffic regulation region, or traffic obstacles of a congestion cause or a congestion length. In this case, the control circuit 2 notifies the user of the traffic obstacle information using sound or using characters or the like on the display screen of the display unit 8; further, the point of the traffic obstacle is shown on the displayed map.

Figure 5:
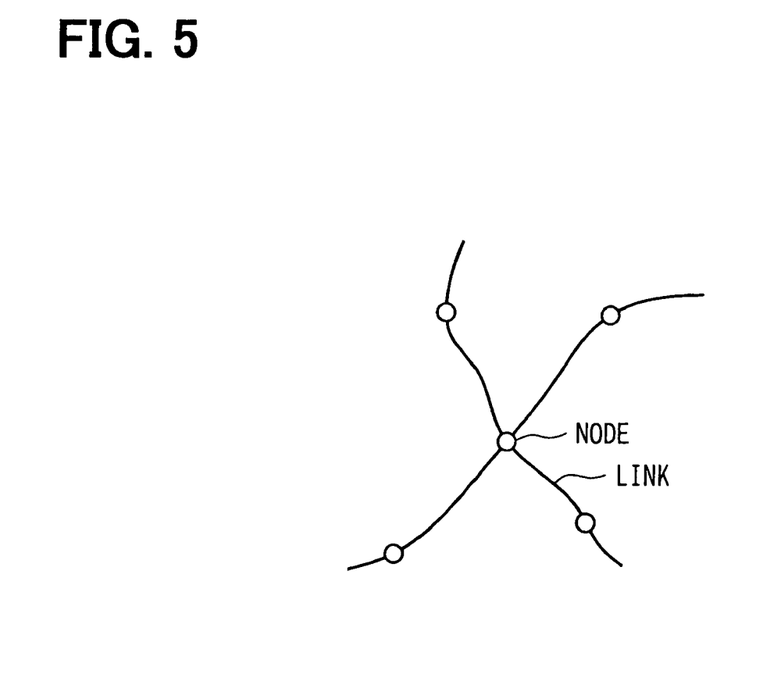
FIG. 5 is a view of roads constituted by nodes and links.

The map data inputted from the map data input unit 5 is mainly data for displaying a map on the display screen of the display unit 6; the data includes node information and link information. As shown in FIG. 5, a map is constituted by roads; the roads are constituted by nodes and links. The node is an intersecting point, a branching point, a converging point, or a bending point having more than a given angle, to divide a road. The link is defined to be between the nodes. Connecting the links forms the map.

Information of a node includes a unique ID of the node, coordinates of the node, and a node attribute such as an intersection. Information of a link includes a unique ID of the link, a link length, coordinates of the start and end points of the link, a road width of the link, a link attribute such as a height from the ground, and a road type. The road type includes an inter-city expressway, an urban expressway, a toll road, an elevated bypass, a national road, a prefectural road, a city road, or the like.

The control circuit 2 displays a map on the display screen of the display unit 6 based on the map data including the node information or the link information. Here, when a current position display mode is selected, a map surrounding the current position of the subject vehicle obtained from the position detector 3 is shown on the display screen. The map scale for displaying can be changed by manipulating the switch group 9 or the remote controller 11. When the map scale is increased, a narrow region map is shown (narrow-region display). When the map scale is decreased, a broad region map is shown (broad-region display).

Figure 2:
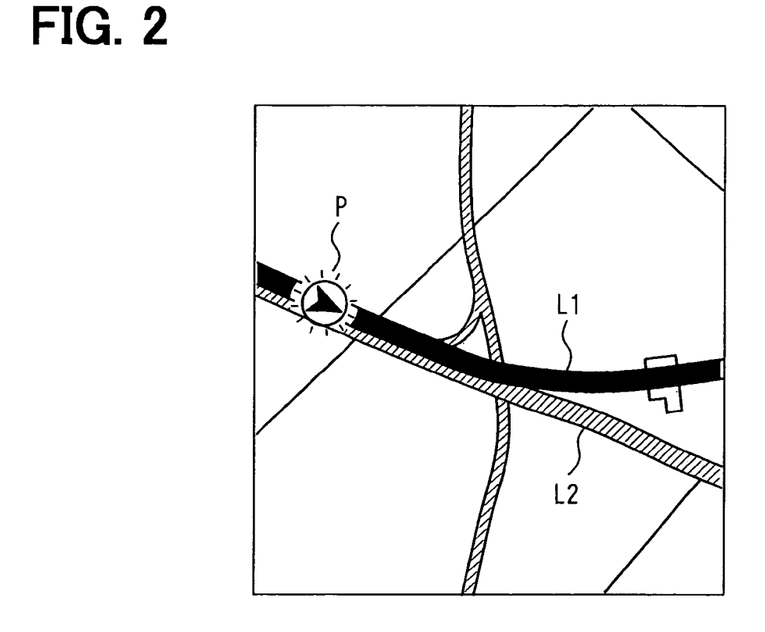
FIG. 2 is a view of a displayed map where an elevated road is indicated in a non-translucent state.

Here, a usual road and an elevated road are displayed as shown in FIG. 2. Suppose a case that an elevated road (e.g, an expressway) overpasses a usual road (e.g., aboveground road) and these two roads run in vertically parallel with each other. That is, these two parallel roads form a two-layered structure. In this case, line L1 indicating the elevated road and line L2 indicating the usual road are displayed in a overlapped state. In the present invention, even when these two roads are displayed as two overlapped lines, an on-traveling road that the subject vehicle is traveling can be clearly determined by changing the expression form of the on-traveling road.

Figure 6:
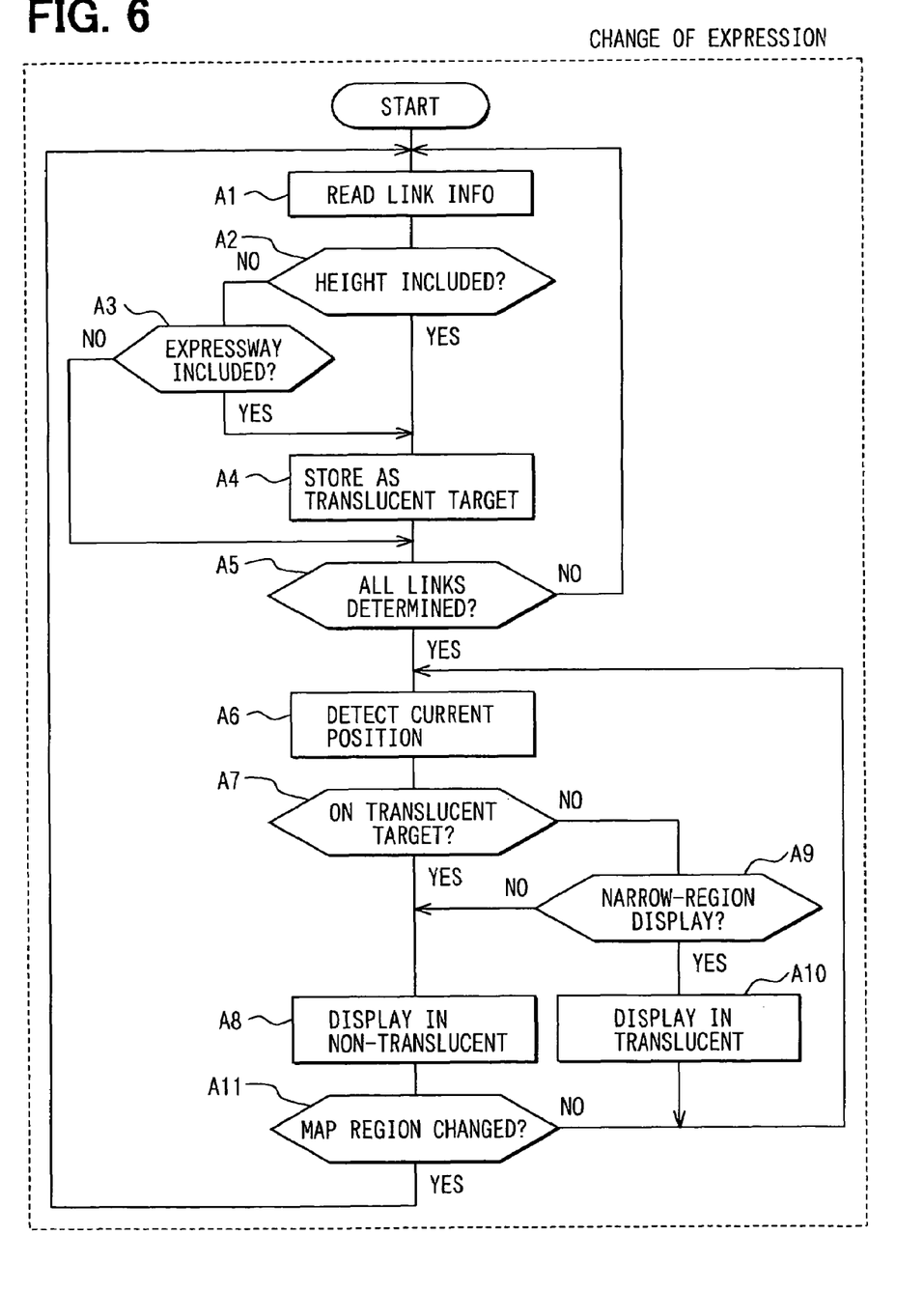
FIG. 6 is a flowchart diagram of a changing process for expressing a road.
Figure 7:
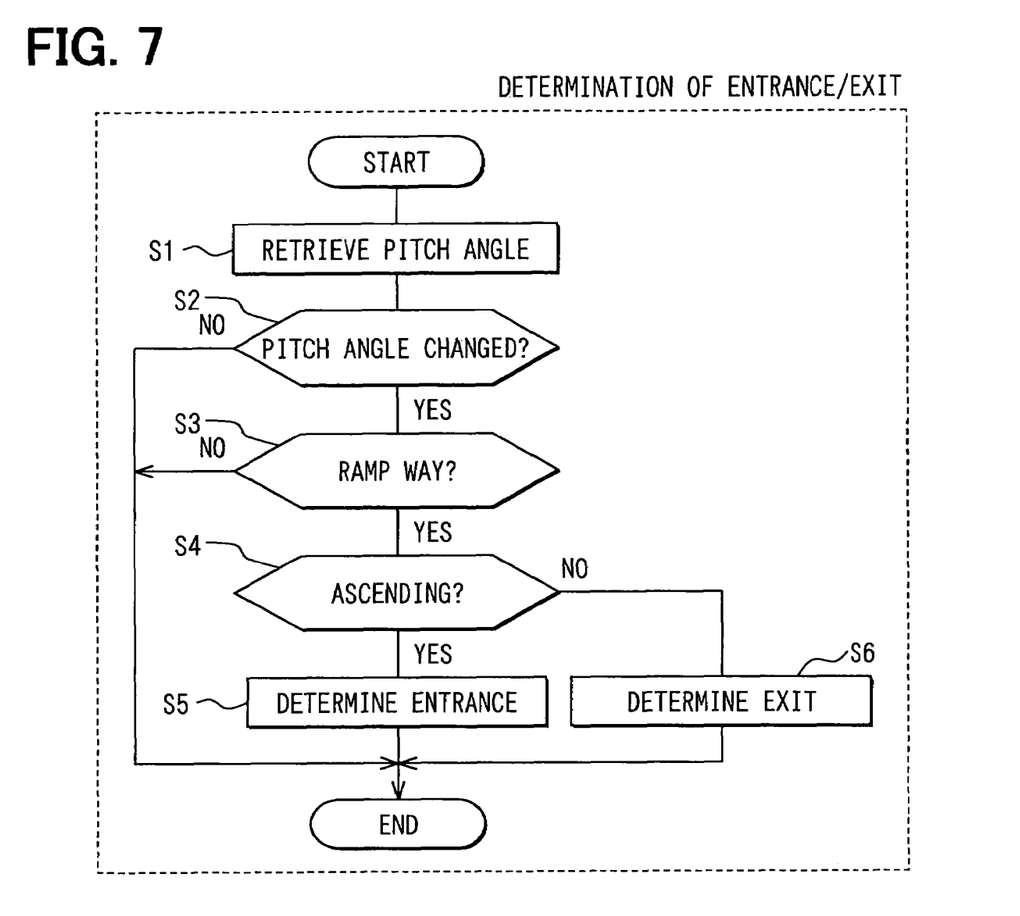
FIG. 7 is a flowchart diagram of a determining process for determining an entrance or an exit of an elevated road.

Changing control of this expression form will be explained with reference to FIGS. 6, 7 below. On the assumption, it needs to be detected that the subject vehicle enters the elevated expressway, or exits from the elevated expressway. This detection of the expressway's entrance and exit is shown in a flowchart in FIG. 7.

At Step S1, the control circuit 2 retrieves pitch angles from the pitch angle sensor 4 in multiple times at intervals. At Step 2, it is determined whether the pitch angle is changed. When the pitch angle is determined to be not changed (Step S2: NO), the sequence ends.

When a vehicle enters the elevated expressway from the usual road, the vehicle ascends a ramp way. When a vehicle exits from the elevated expressway to the usual road, the vehicle descends a ramp way. Therefore, when the vehicle enters the elevated expressway or exits from the elevated expressway, the pitch angle changes from an approximately horizontal state to an increased state in the positive side (the vehicle body ascends in the advancing direction) or to an increased state in the negative side (the vehicle body descends in the advancing direction), respectively. Whether the vehicle enters the elevated expressway or exits from the elevated expressway can be thereby determined by the change direction of the pitch angle. However, the vehicle ascends or descends even on the usual road alone or even on the expressway alone, so detection cannot be possible by only using the change direction of the pitch angle.

Therefore, when the pitch angle is determined to be changed (Step S2: YES), the control circuit 2 detects the current position using the detection information from the position detector 3 to collate it with the map data. At step 3, it is thereby determined whether the current position is on a ramp way or not. When it is determined to be not on a ramp way (Step S3: NO), the sequence ends.

When the current position is determined to be on a ramp way (Step S3: YES), the sequence advances to Step S4. Here, it is determined whether the vehicle is ascending from the pitch angle. When the vehicle is determined to be ascending (Step S4: YES), it is determined that the vehicle enters the elevated expressway at Step S5 and then the sequence ends. When the vehicle is determined to be not ascending (Step S4: NO), it is determined that the vehicle exits from the elevated expressway at Step S6 and the sequence ends. The determination results at Steps S5, S6 are stored in the RAM. As explained above, the control circuit 2 functions as a determining unit along with the pitch angle sensor 4 and the map data input unit 5.

Next, the expression change of the elevated expressway where the elevated expressway and the usual road run in parallel will be explained with reference to FIG. 6. First, the control circuit 2 computes a map region for displaying a map on the display screen of the display unit 6 based on the current position detected by the position detector 3 and the selected scale of the display map. The control circuit 2 then obtains map data corresponding to the computed map region from the map data input unit 5. The control circuit 2 then reads link information from the obtained map data at Step A1.

Next, it is determined whether the read link information includes height information at Step A2. When the height information is determined to be included (Step A2: YES), the corresponding link is stored as a translucent display target link in, e.g., the external memory 12 (Step A4). When the height information is determined to be not included (Step A2: NO), the sequence advances to Step A3. Here, the control circuit 2 determines whether the road kind of the link information is any one an inter-city expressway, an urban expressway, a toll road, and an elevated bypass. When it is any one of them (Step A3: YES), the corresponding link is stored as a translucent display target link in, e.g., the external memory 12 (Step A4). When it is none of them (Step A3: NO), the corresponding link is not treated as a translucent display target link and the sequence advances to Step A5.

After the above process is completely executed with respect to all the link information included in the obtained map data (Step A5: YES), the control circuit 2 detects the current position of the subject vehicle (Step A6). the control circuit 2 then determines whether the current position is on the translucent display target link at Step A7.

When the current position is determined to be on the translucent display target link (Step A7: YES), the control circuit 2 displays the road that includes the translucent display target link which the subject vehicle is located in, in a non-translucent state at Step A8. Namely, when the subject vehicle is on the elevated road, the elevated road is displayed on the display screen of the display unit 6 in the non-translucent state as shown in FIG. 2.

Figure 3:
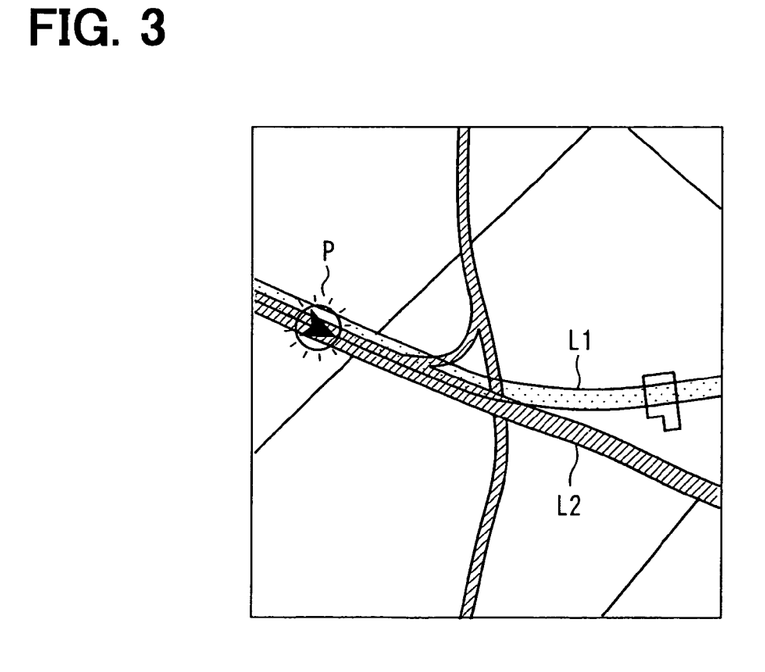
FIG. 3 is a view of a displayed map where an elevated road is indicated in a translucent state.

In contrast, when the current position is determined to be not on the translucent display target link (Step A7: NO), it is determined whether the scale is a given value or more (i.e., whether the map is displayed in a narrow-region display) at Step A9. When the scale is determined to be a given value or more (Step A9: YES), the control circuit 2 displays the road that includes the translucent display target link which the subject vehicle is located in, in a translucent state at Step A10. Thus, as shown in FIG. 3, both the roads shown as being overlapped are displayed in translucent states, so both the usual road and the elevated road can be visible. In FIGS. 2, 3, pointer P indicates the current position of the subject vehicle.

Further, when the subject vehicle is not on the translucent display target (Step A7: NO) and the displayed map is shown not in a scale exceeding a given value (i.e., the map is displayed in not the narrow-region display) (Step A9: NO), the sequence advances through Step A8 to Step A11 where the road including the corresponding link is displayed in the non-translucent state. Namely, when a broad region map is displayed on the display screen, only the expressways and main national roads are displayed while the usual roads that run in parallel with the expressways or the main national roads are not displayed. It is thereby unnecessary that the elevated expressway is displayed in a translucent state.

Further, the above process at Steps A1 to A5 where the translucent display target link is stored in the external memory 12 is repeated each time the displayed map region is changed at Step A11.

Thus, according to this embodiment, when the subject vehicle travels the usual road that runs in vertically parallel with the elevated road, this elevated road is displayed in the translucent state. Therefore, the corresponding usual road can be visible through the elevated road even when the lines indicating the elevated road and the usual road are overlapped with each other. In contrast, when the subject vehicle travels the elevated road that runs in vertically parallel with the usual road, this elevated road is displayed in the non-translucent state. Therefore, the on-traveling elevated road can be clearly seen.

Second Embodiment

A second embodiment of the present invention will be explained with reference to FIGS. 8, 9A to 9C below. The second embodiment is directed to two parallel roads that run in horizontally parallel (in a road-width direction) with each other. Further, the basic structure of the car navigation system is the same as the first embodiment. Explanation will be thereby done with respect to the different parts from the first embodiment.

Figure 9A:
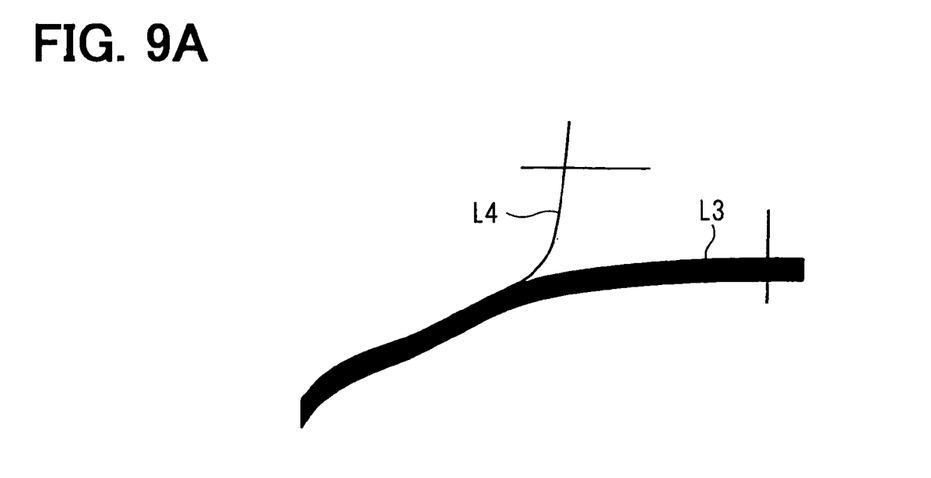
FIGS. 9A to 9C are views showing expressions of parallel roads on a displayed map.

Lines L3, L4 indicating two horizontally-parallel roads are displayed as shown in FIG. 9A. Here, line L3 indicates a wide bypass road while line L4 indicates a side road or service road of the bypass road. Usual roads excluding elevated roads are displayed in non-translucent states or images, so lines L3, L4 parallel with each other are overlapped on the display screen, so two lines L3, L4 cannot be distinguished from each other. Therefore, even when pointer P indicates the current position of the subject vehicle, it is difficult to recognize which road of the two parallel roads L3, L4 the subject vehicle is traveling. The second embodiment enables detecting which road the subject vehicle is travels.

Figure 8:
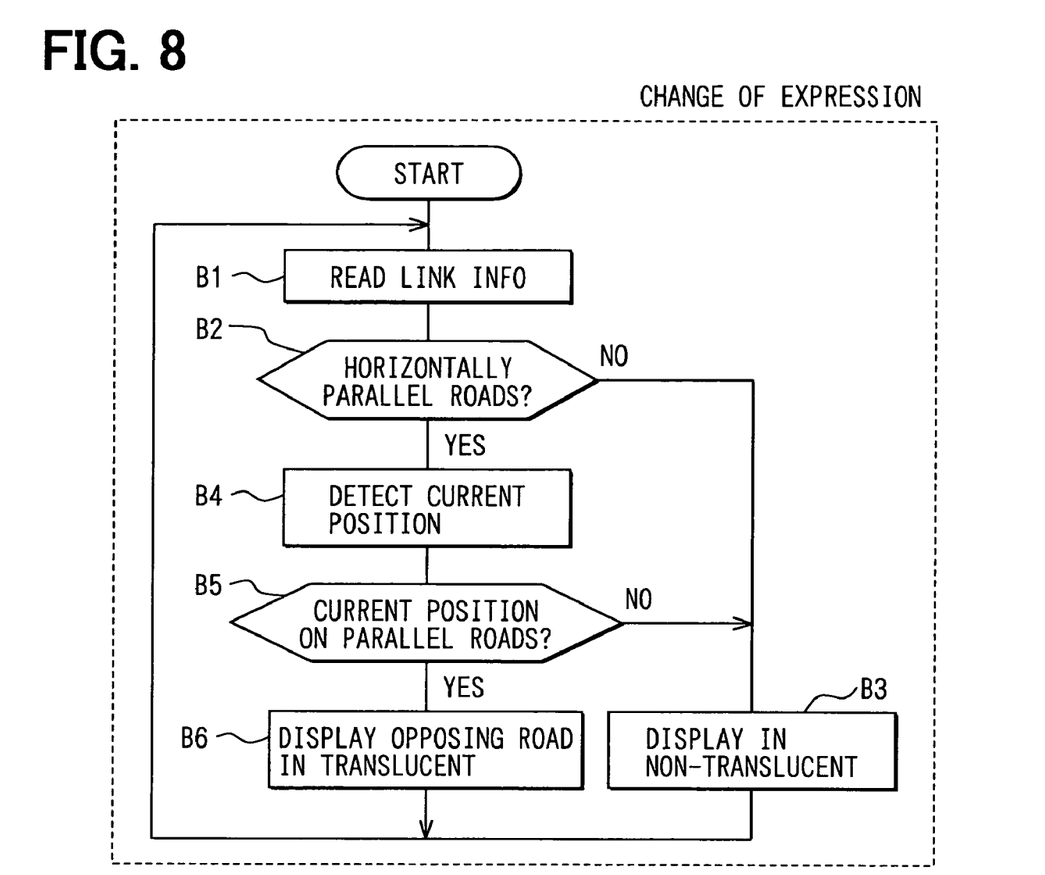
FIG. 8 is a flowchart diagram of a changing control for expressing a road according to a second embodiment of the present invention.

As shown in FIG. 8, first, the control circuit 2 computes a map region for displaying a map on the display screen of the display unit 6 based on the current position detected by the position detector 3 and the selected scale of the display map. The control circuit 2 then obtains map data corresponding to the computed map region from the map data input unit 5. The control circuit 2 then reads link information from the obtained map data at Step B1. Next, it is determined whether links or roads that are horizontally in parallel are present by using the coordinates of the start and end points of the links included in the obtained map data at Step B2. Here, the roads in horizontally parallel means roads that run side by side within a given separating distance in a road-width direction. This given separating distance means a separating distance in which two parallel roads are displayed as being overlapped in a selected map scale.

When links or roads that are horizontally in parallel are determined to be not present (Step B2: NO), the usual roads excluding the elevated roads are displayed in non-transparent states at Step B3. When links or roads that are horizontally in parallel are determined to be present (Step B2: YES), the current position is then obtained at Step B4. It is then determined whether the current position is on any one of the determined parallel roads at Step B5. When the current position is determined to be not on any one of the parallel roads (Step B5: NO), the roads excluding the elevated roads are displayed in non-translucent states at Step B3.

Figure 9B:
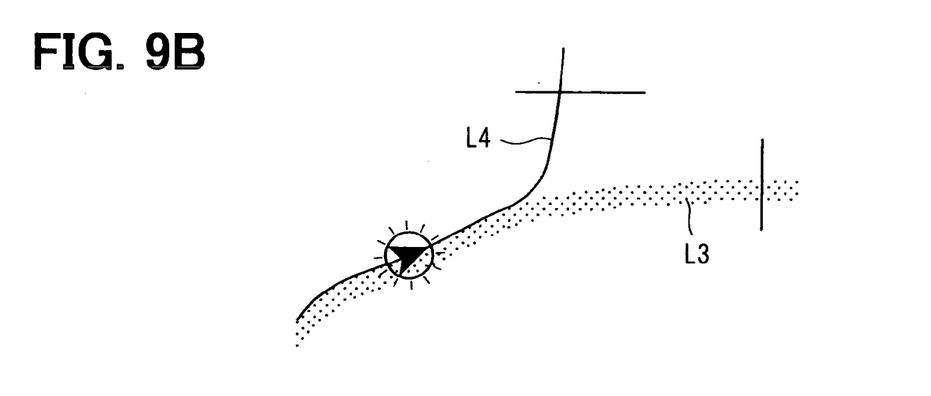
Figure 9C:
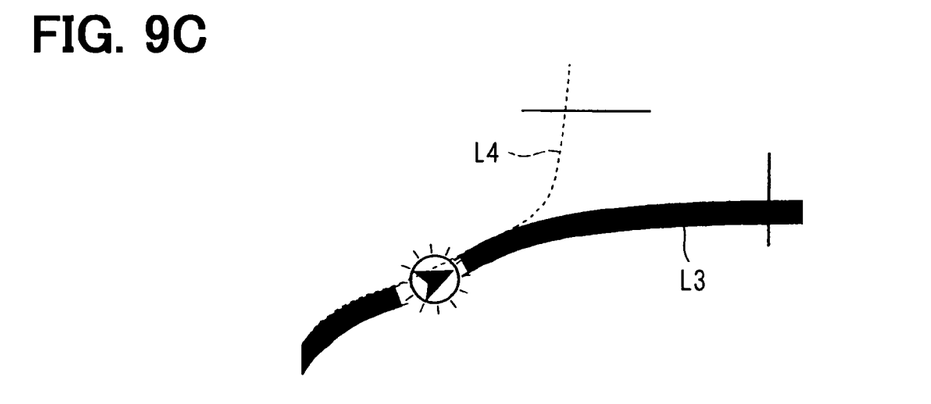

When the current position is determined to be on any one of the parallel roads (Step B5: YES), the on-traveling road that the subject vehicle is traveling is continuously displayed in a non-translucent state while an opposing road of the parallel roads that opposes the on-traveling road is displayed in a translucent state at Step B6. Namely, when the subject vehicle is traveling the road L4 of the two parallel roads L3, L4 shown in FIG. 9A, the displaying state of the on-traveling road L4 is continuously a non-translucent state while the displaying state of the opposing road L3 is changed to a translucent state, as shown in FIG. 9B. In contrast, when the subject vehicle is traveling the road L3, the displaying state of the on-traveling road L3 is continuously a non-translucent state while the displaying state of the opposing road L4 is changed to a translucent state, as shown in FIG. 9C.

According to this embodiment, when the subject vehicle is traveling either road of the horizontally parallel roads, the on-traveling road the subject vehicle is traveling is displayed in a non-translucent state while the other road of the parallel roads is displayed in a translucent state. Which road the subject vehicle is traveling can be thereby easily recognized.

Further, that the on-traveling road is displayed in the non-translucent state or line enables the user to determine mis-recognition of the on-traveling road by the control circuit 2. Namely, the control circuit 2 sometimes mis-recognizes as an on-traveling road the other road among the parallel roads instead of the actual on-traveling road. Suppose a case where the user recognizes that the on-traveling road is a national road from a road sign or the like and further that the national road continues to run straightaway for a while. Under this case, further suppose that the national road is displayed in a translucent state while the opposing narrow side road running in parallel with the national road is displayed in the non-translucent state, because of the mis-recognition by the control circuit 2. Here, the user determines the mis-recognition by the car navigation system 1, so the user drives without relying on the mis-guidance (e.g., "Turn to the left at the next intersection") by the system 1. The user is thereby prevented from mis-driving.

Others (1) In the first embodiment, when the VICS information relating to the elevated road is displayed on the display unit 6, characters or signs indicating this information can be displayed in the translucent state or the non-translucent state in accordance with the translucent state or the non-translucent state in which the elevated road is shown. Thus, when the subject vehicle travels the usual road, the usual road of the on-traveling road can be prevented from becoming invisible because of the display of the information relating to the elevated road. Similarly, in the second embodiment, the VICS information relating to the on-traveling road can be displayed in a non-translucent state, while information relating to the other opposing road can be displayed in a translucent state.

(2) The second embodiment can be directed to an elevated road. Namely, the elevated road is usually displayed in a non-translucent state similarly to the usual road. Suppose that the elevated road runs in the horizontally parallel with the usual road. In this case, when the subject vehicle travels this usual road, the displaying state of the elevated road is changed to a translucent state. Otherwise, when the subject vehicle travels the elevated road, the displaying state of the opposing road that runs in parallel with this elevated road is changed to a translucent state.

(3) The first and second embodiments can be directed to parallel roads that consist of one that is an underground road or a trench-type road and the other that is a usual aboveground road. Here, in the second embodiment, the pitch angle sensor 4 can be also used for detecting the entrance or exit of the elevated road or the underground road.

(4) To receive the VICS information, a receiver can be provided for an optical beacon or a radio-wave beacon. For instance, the optical beacon is installed mainly for individual lanes of usual roads excluding the expressways, while the radio-wave beacon is installed mainly for entrances of the expressways. Therefore, these beacons can be used for the determining unit. Namely, whether the subject vehicle travels the usual road or the expressway is determined by which beacon of the two optical and radio-wave beacons receives the VICS information.

(5) To determine an underground road, the GPS receiver can be used. Namely, when the subject vehicle travels the underground road, the GPS receiver sometimes cannot receive radio-waves from the satellites. This phenomena can be used for helping determining that the subject vehicle is traveling the underground road.

(6) Parallel roads are not limited to two parallel roads. For example, three parallel roads of an aboveground national road, an elevated expressway, and a service road can be present. In this case, the on-traveling road can be displayed in the non-translucent state, while the other two roads can be displayed in translucent states.

It will be obvious to those skilled in the art that various changes may be made in the above-described embodiments of the present invention. However, the scope of the present invention should be determined by the following claims.

What is claimed is:

1. A car navigation mounted in a vehicle, the system comprising:
    a position obtaining unit that obtains a current position of the vehicle;
    a map data obtaining unit that obtains map data;
    a display unit that displays a map surrounding the obtained current position;
    a first determining unit that determines an elevated road from the obtained map data;
    a second determining unit that determines whether the obtained current position is on the determined elevated road; and
    a display changing unit that displays, within the displayed map, the elevated road in a translucent state before the current position is determined to be located on the elevated road, and
    in a non-translucent state after the current position is determined to be located on the elevated road,
    wherein the second determining unit includes a pitch angle sensor that detects a pitch angle of the vehicle,
    wherein, in a case that the current position is located in a ramp way when an inclination of the vehicle is detected from the detected pitch angle, the second determining unit determines that the current position is located in one of an entrance and an exit of an elevated road.

2. A car navigation system of claim 1, further comprising:
a traffic information obtaining unit that obtains traffic information,
wherein, when the obtained traffic information relates to the elevated road and is displayed on the display unit, the display changing unit displays the obtained traffic information in one of the translucent state and the non-translucent state in which the elevated road is displayed.

3. A car navigation system mounted in a vehicle, the system comprising:
a position obtaining unit that obtains a current position of the vehicle;
a map data obtaining unit that obtains map data;
a display unit that displays a map surrounding the obtained current position;
a first determining unit that determines an elevated road from the obtained map data;
a second determining unit that determines whether the obtained current position is on the determined elevated road;
a display changing unit that displays, within the displayed map, the elevated road in a translucent state before the current position is determined to be located on the elevated road, and in a non-translucent state after the current position is determined to be located on the elevated road;
a traffic information obtaining unit that obtains traffic information from an external information source outside of the vehicle via a wireless communications link, the obtained traffic information being superimposed on the displayed map; and
a third determining unit that determines whether the obtained traffic information relates to the elevated road,
wherein, when the obtained traffic information is determined to be related to the elevated road, the display changing unit displays the obtained traffic information in one of the translucent state and the non-translucent state in which the elevated road is displayed.

4. A car navigation system of claim 3,
wherein the second determining unit includes a pitch angle sensor that detects a pitch angle of the vehicle,
wherein, in a case that the current position is located in a ramp way when an inclination of the vehicle is detected from the detected pitch angle, the second determining unit determines that the current position is located in one of an entrance and an exit of an elevated road.

\* \* \* \* \*